April 26, 1955 — D. W. FENTRESS ET AL — 2,707,117
REINFORCED FLEXIBLE BELLOWS JOINT
Filed Feb. 3, 1948 — 2 Sheets-Sheet 2
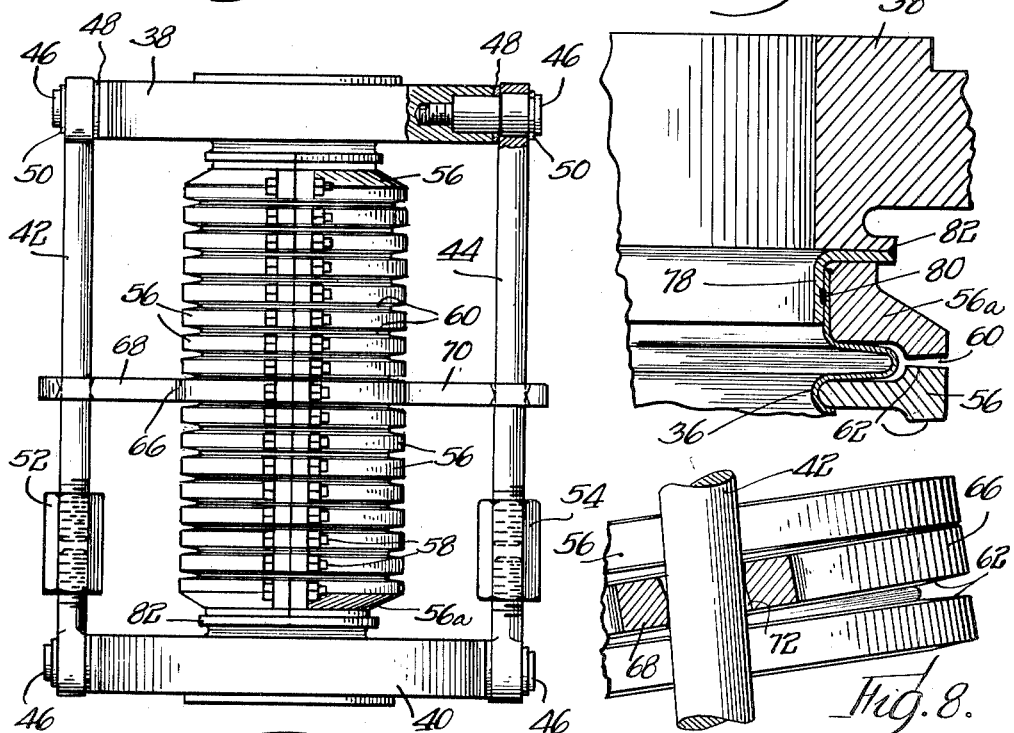
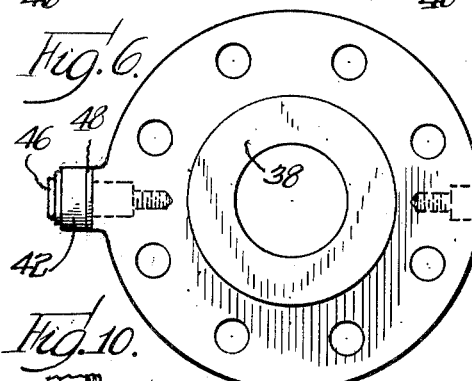
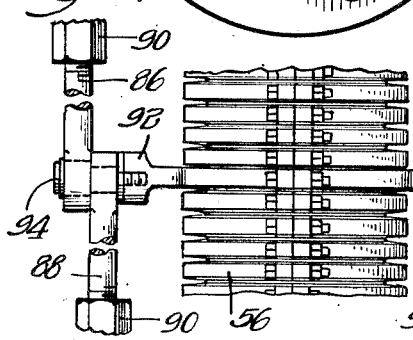
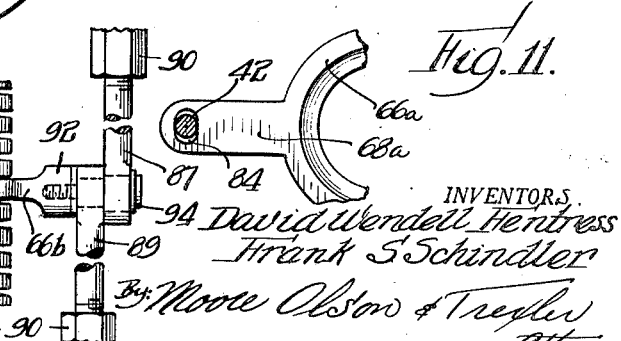
INVENTORS
David Wendell Fentress
Frank S. Schindler
By Moore Olson & Trexler
attys.

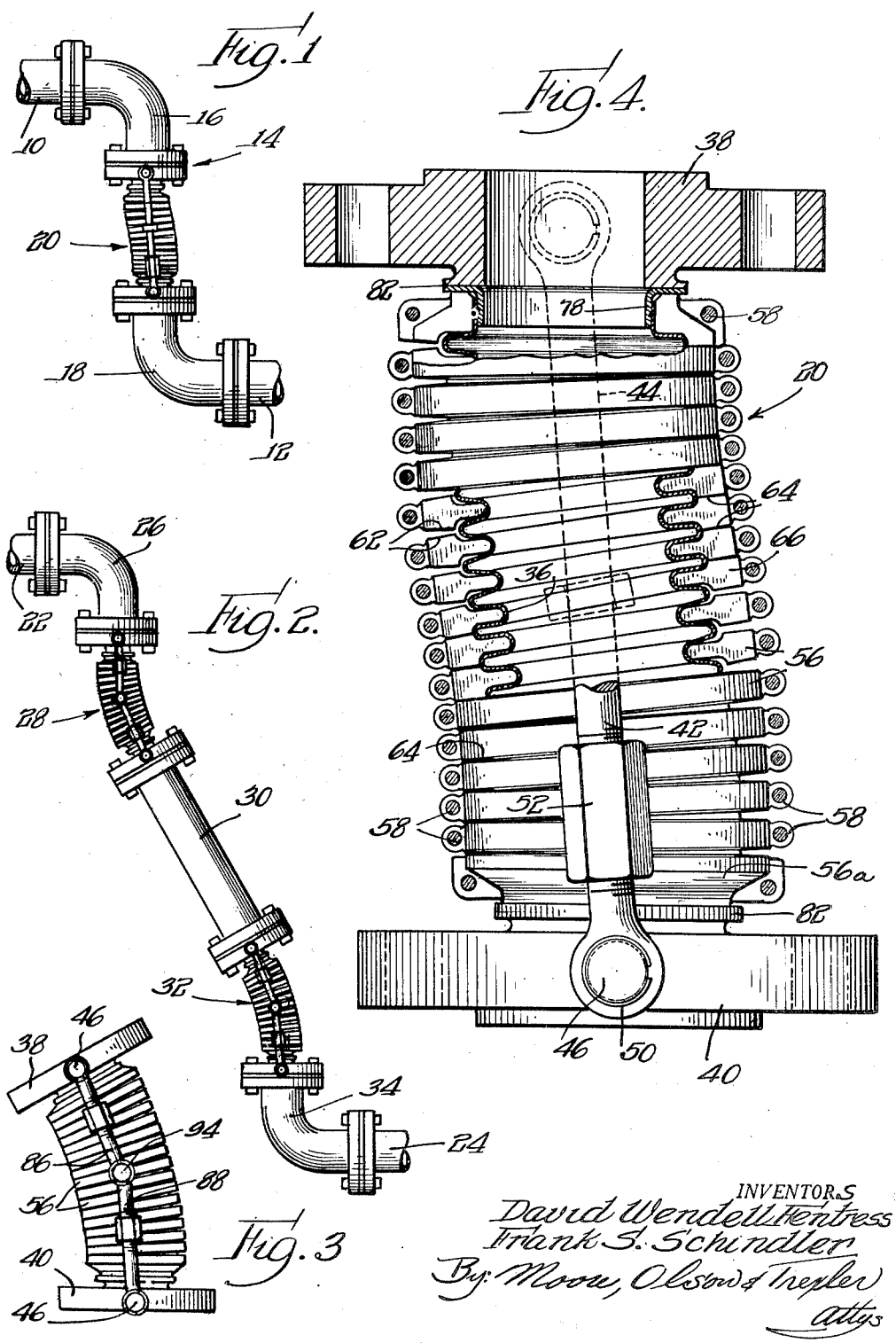

United States Patent Office 2,707,117
Patented Apr. 26, 1955

2,707,117

REINFORCED FLEXIBLE BELLOWS JOINT

David Wendell Fentress, Barrington, and Frank S. Schindler, Elgin, Ill., assignors to Chicago Metal Hose Corporation, Maywood, Ill., a corporation of Illinois Application February 3, 1948, Serial No. 5,967

3 Claims. (Cl. 285—90)

This invention relates to expansion joints for conduits, pipe lines and the like, and concerns particularly expansion joints for use in high pressure assemblies.

In the conventional use of pipe line expansion joints, the shiftable or expansion member is inserted coaxially between two adjacent rigid pipe sections so as to absorb the relative axial motion therebetween resulting from thermal expansion and contraction of the rigid pipe sections, or other causes inducing relative motion.

In such installations, hangers or anchors are provided for supporting and holding the rigid pipe sections. In instances wherein the pipe line is provided for conducting a fluid under pressure, the hangers or anchors, as the case may be, are required to resist the axial thrust imparted to the rigid pipe sections due to the fluid pressure, as well as the axial force required to effect the compression or expansion of the expansion joint. More particularly, whereas in rigid piping the axial forces set up by pressure of the conducted fluid are balanced out, and absorbed by the wall tension of the rigid pipe; the introduction of a yieldable expansion joint in the line produces a condition of unbalance in the adjacent rigid pipe sections, equal to the product of the fluid pressure and the area of the flow section.

In large pipe line installations, or in installations wherein fluids are being conducted under high pressures, these unbalanced forces producing an axial thrust upon the rigid pipe sections may become very large. This requires the use of strong and expensive hangers and anchorage means for the conduit sections which are not only costly and cumbersome, but may also tend to interfere with the proper operation of the expansion joint.

In accordance with the present invention, means and methods are provided for utilizing expansion joints in pipe lines, in a manner so as to neutralize or avoid the setting up of the forces of unbalance previously mentioned, whereby to reduce the load upon the pipe line hangers or supports substantially to the dead weight or gravity load of the pipe. More specifically stated, means and methods are provided in accordance with the present invention whereby the internal pressures of the conducted fluids, and the axial forces set up thereby, are absorbed within and by the expansion joint itself, and by reason of its arrangement in respect to the adjacent pipe sections.

It is an object of the present invention to provide an expansion joint structure of improved construction and improved operating characteristics.

More specifically stated, it is an object of the present invention to provide an expansion joint assembly, particularly for high pressure conduits and pipes, wherein the internal pressures of the conducted fluids and the forces set up thereby are neutralized and absorbed in an improved manner.

A further object of the invention is to provide an improved expansion joint, particularly for high pressure use, wherein the movements of the various components or parts of the joint, as it shifts in use, are controlled and predetermined in an improved manner whereby to equalize and distribute stresses, preclude rupture, and promote durability of the structure.

A still further object of the invention is to provide improved coupling means, particularly for expansion joints of the type defined.

Various other objects, advantages, and features of the invention will be apparent from the following specification, when taken in connection with the accompanying drawings, wherein certain preferred embodiments are set forth for purposes of illustration.

In the drawings, wherein like reference numerals refer to like parts throughout:

Fig. 1 is a general assembly view of an expansion joint made in accordance with and embodying the principles of the present invention, in accordance with one preferred embodiment thereof;

Fig. 2 is a general assembly view of a modified form of expansion joint assembly, also incorporating the principles of the present invention, and arranged to absorb a greater range of movements of the adjacent rigid pipe line sections;

Fig. 3 is an enlarged detail of a part of the structure of Fig. 2;

Fig. 4 is an enlarged side view, partly in section, of the motion absorbing or shifting structure forming a part of the expansion joint or assembly set forth in Fig. 1; the structure being shown in its flexed or shifted condition;

Fig. 5 is a reduced scale front view of the structure of Fig. 4, in unflexed condition;

Fig. 6 is a top view of the structure of Figs. 4 and 5;

Fig. 7 is a partial detail section, on an enlarged scale, showing an end portion of the shifting structure in unflexed condition, and the manner of securing the end couplings thereto;

Fig. 8 is a partial view, similar to Fig. 4, more particularly illustrating the manner in which the central control ring operates in respect to the tie bars to control the movement of the shifting unit in operation;

Fig. 9 is a detail view of the central control ring forming a part of the shifting structure or unit;

Fig. 10 is a partial front view of the modified form of shifting unit structure illustrated in Fig. 3; and Fig. 11 is a partial detail view of a still further modified form of shifting unit structure.

Referring more specifically to the drawings, in Fig. 1 there is illustrated a pipe line installation comprising a first pipe section 10 and a second pipe section 12, interconnected by means of an expansion joint or assembly, generally indicated by the numeral 14. The expansion joint comprises, more specifically, an elbow section 16 connected to the pipe 10, an elbow section 18 connected to the pipe 12, and a shifting unit 20 interconnecting the elbows. As will be more particularly hereinafter described, the shifting unit of the present invention is precluded from axial motion, but may be arranged for lateral movement between its ends, as shown in Fig. 1, or for bending movement, as illustrated in Fig. 2. In Fig. 1 the unit is shown shifted to its maximum limits in one lateral direction. It will be seen that upon axial motion of the pipe 10 to the right and pipe 12 to the left relative to each other, such motion for example being induced by thermal expansion of the pipes or other causes, the unit 20 can shift laterally, the upper portion thereof being movable to a maximum offset position in respect to the lower portion to the right a distance equal to its leftward offset in initial position, as shown.

In Fig. 2 an installation is illustrated wherein the expansion joint is arranged to accommodate a greater axial motion between the rigid pipe sections 22 and 24 to be connected. In this instance the expansion joint comprises an elbow 26 interconnecting the first pipe section 22 with the upper end of a first shifting unit as indicated at 28. A rigid pipe section 30 of predetermined desired length interconnects the lower end of shifting unit 28 with the upper end of a second shifting unit as indicated at 32, the lower end of which is connected by means of an elbow 34 with the second pipe section 24. In this instance the shifting units 28 and 32 are arranged for bending movement; and the arrangement of the parts including the rigid pipe section 30 is such, as will be understood, as to accommodate a wide range of axial shifting between the pipes 22 and 24. As shown for example in Fig. 2, the pipe 22 may move to the right in respect to pipe 24 a distance equal to its leftward lateral offset, as shown. By increasing the length of the rigid pipe section 30, the range of movement will be correspondingly increased.

Preferably the shifting units, when employed for bending movements as in Fig. 2, are somewhat differently constituted than when employed for lateral shifting as in Fig. 1. The particular unit 20 of Fig. 1 is shown in detail in Figs. 4–9. The units 28 and 32 of Fig. 2 are more particularly illustrated in Figs. 3 and 10, and a modified form of bending unit is shown in Fig. 11.

Referring more specifically to Figs. 4–9, in Fig. 4 it will be seen that the unit comprises a length of flexible metal tubing 36 interconnected in a fluid-tight manner between a pair of end members or flanges 38 and 40 by means of which the unit is interconnected with the adjacent conduit parts. The tubing 36 is preferably of the annularly corrugated one piece type, formed from a cylindrical blank either drawn or longitudinally seam welded from sheet stock.

A pair of tie bars 42 and 44, Fig. 5, interconnects the flange members 38 and 40, said tie bars being pivotally connected to the flanges at each bar end. More particularly, as shown in Figs. 4 and 5, each flange member is tapped to receive a pair of diametrically projecting pins 46, to which the bar ends are pivotally connected. As indicated in the upper lefthand portion of Fig. 5, wherein one of the pin connections is shown in section, the flange body is tapped to receive the pin, there being a spacing washer 48 interposed between the flange body and the tie bar to hold the tie bar in properly spaced position. A split snap ring 50 is engaged into an annular groove on the pin so as to hold the tie bar in proper position thereon, against longitudinal displacement. By means of the tie bar connections thus provided, it will be seen that the end flanges 38 and 40 are precluded from axial motion toward and away from each other, but can be relatively laterally shifted, or rotated in respect to each other around the pin axes.

As further shown in Figs. 4 and 5, the tie bars are each formed of two independent bars or sections having common interthreaded connection with adjustment nuts as indicated at 52 and 54. The nuts are connected to the two bar portions, respectively, by right and lefthand threads, so that upon rotation of the nuts the collective bar members may be elongated or contracted whereby to effect the adjustable separation or contraction of the end flanges 38 and 40.

A series of reinforcing rings 56 is disposed in embracing relation around the convolutions of the tubing 36, each ring being comprised of two half circular sections connected together by means of bolts 58. As best shown in Fig. 4, the inner surfaces of the rings are shaped to conform with the contours of the tubing convolutions so that snug interengagement exists therebetween. Normally, when the unit is in unflexed condition, as shown in Fig. 5, the rings 56 are spaced slightly from each other as indicated at 60. See also Fig. 7.

As best shown in Figs. 4 and 7, the outer annular side portions of the rings are slightly beveled or tapered, as indicated at 62, the angle of taper being such that these ring surfaces lie flat against each other when brought into contact by the flexing of the unit, such contact being indicated at 64 in Fig. 4. The engagement of the ring surfaces 62 acts as a limiting means for limiting the degree of bending which may be imparted to any portion of the unit as it is flexed in service. In other words, the engagement of the ring surfaces 62 acts as a limiting means to determine the magnitude of lateral shifting between the end flanges, for example as in the installation of Fig. 1, or the proper degree of rotation of the end flanges around the axes of the pins 46, for example as in the installation of Fig. 2. Furthermore, not only does the engagement of the ring surfaces limit the over-all permissible shifting of the end flanges 38 and 40 laterally, but such engagement also insures a uniform bending of the tubing 36 at such limiting positions; thereby preventing undue stress being imparted to any tubing convolution, to the exclusion of others, or the buckling or bulging of the tubing laterally, even under conditions of high pressure.

To further control the flexing of the unit in service, the central reinforcing ring designated by the reference numeral 66 is provided, as best shown in Fig. 9, with a pair of oppositely projecting ears 68 and 70, each of which is provided adjacent its end with an opening 72 for the reception of the associated tie bar 42 or 44. As shown in Fig. 8, the openings 72 are shaped with oppositely extending conical sections whereby to permit rotational movement between the ring 66 and the tie bars, while at the same time acting to limit the magnitude of such movement.

The shaping and disposition of the reinforcing rings 56, coupled with the action of the tie bars 42 and 44 and their interengagement with the central control or reinforcing ring 66, thus provides for the controlled flexing of the unit as the opposite end flanges 38 and 40 are subjected to lateral shifting movements. Even under conditions of high pressure, buckling or distortion of the unit, or undue stressing of any tubing convolution, is precluded. At the same time the tie bars 42 and 44 prevent axial separation of the flange members 38 and 40 relative to each other, whereby the shifting unit is self-contained in respect to axial pressures, precluding the imparting of axial forces due to the fluid pressure to the adjacent conduit parts. When the expansion joint is arranged, as illustrated in Fig. 1, axial movements between the pipes 10 and 12 are accommodated, while at the same time no axial forces are imparted to the pipes regardless of the magnitudes of the conducted fluid pressures, or the variations thereof.

The reinforcing rings 56 not only operate to control the flexing movements of the shifting unit, but also operate to prevent collapse of the tubing convolutions due to the fluid pressures, thus reinforcing the convolutions and enabling the tubing 36 to conduct fluids at relatively high pressures without undue distortion or danger of rupture.

The means by which the ends of the tubing are interconnected with the end flanges are particularly shown in Fig. 7, the connection with the end flange 38 being illustrated. It will be seen that the end of the tubing is provided with a coupling piece 78, L-shaped in cross section, the cylindrical wall of which is circular seam resistance welded to the tubing end as indicated at 80. The radial flange portion of the coupling piece is preferably fusion welded to the lower part of the end flange 38 as indicated at 82. It will be seen that the thickness of the coupling piece 78 is greater than the wall section of the tubing 36, but the difference is not so great as to preclude the production of a satisfactory seam resistance weld 80. The relatively thicker coupling piece may be satisfactorily fusion welded to the flange 38, the coupling piece thus acting as a transition member between the thin walled tubing and the relatively massive coupling member 38. It will be noted that the end reinforcing ring, indicated by the numeral 56a is somewhat differently shaped than the reinforcing rings 56, to accommodate the shaping of the tubing end. The ring may be mounted in position after the formation of the circular seam resistance weld.

In instances wherein the shifting unit is to be subjected to bending movements between the end flanges, if such bending movements are not large the unit may be constructed as indicated in Fig. 11. In such instance the structure is the same as previously described in reference to Figs. 4–9, except that the central control or reinforcing ring 66a is provided with diametrically opposite slots 84, Fig. 11, for the reception of the tie bars. By this means a limited lateral motion is permitted between the tie bars and the central control ring, so that as the unit is bent in service it may assume a contour or shaping such as indicated in Fig. 2.

In other instances, as for example when the unit is to be subjected to a greater degree of bending motion, it may be preferable to provide tie bar connections as shown in the particular shifting units illustrated in Figs. 2, 3 and 10. More specifically, it will be seen that the tie bars are in this instance provided in two sets as indicated at 86—87 and 88—89, each individual tie bar having its own adjustment nut 90 corresponding to the adjustment nuts 52 and 54 previously described. The central control ring 66b is provided with diametrically disposed enlarged bosses 92 into which pins 94 are tapped, in the manner of the pins 46 previously described. The central juxtaposed ends of the bars 86, 88 and 87, 89 are both pivotally mounted upon the pins 94, the pins thus providing a common pivotal mounting for the tie bar central ends.

As the end flanges of the unit are subjected to bending moment, the internal fluid pressures tending to thrust the central portion of the unit laterally, in the vicinity of the central control ring 66b, are balanced substantially by the pull of the tie bars induced by the fluid pressure end thrust. At the same time the tie bars prevent elongation of the unit due to such axial or end thrust pressures, whereby the unit is self-contained and precludes the transmission of axial thrust forces to the adjacent piping and conduits, as has been previously discussed. The controlled flexing of the unit results, together with the avoidance of transmitted forces to the adjacent piping, in accordance with the purposes of the invention.

While in the particular embodiments set forth interconnection between the tie bars and the reinforcing rings is effected at only one point, viz., at the center of the unit, it is to be understood that interconnection may be made at several spaced points, if desired.

It is obvious that various changes may be made in the particular embodiments set forth without departing from the spirit of the invention. The invention is accordingly not to be limited to the particular embodiments shown and described, but only as indicated in the following claims.

The invention is hereby claimed as follows:

1. An expansion joint for interconnecting relatively shiftable conduits comprising a shifting unit having a pair of relatively shiftable end members, said members being arranged for connection respectively to said conduits, an annularly corrugated flexible metal tubing interconnecting said members, a plurality of reinforcing rings embracing the convolutions of the tubing, there being one reinforcing ring for each convolution and each reinforcing ring having an inward radial portion engaging the trough of its corresponding convolution, means interconnecting said members for positively precluding the axial separation thereof, and plate-like extensions formed integral with an intermediate reinforcing ring and apertured to provide a slide connection with the means precluding axial separation of said end members.

2. An expansion joint for interconnecting relatively shiftable conduits comprising a shifting unit having a pair of relatively shiftable end members, an annularly corrugated flexible tubing interconnecting said members, a plurality of reinforcing rings embracing the convolutions of the tubing, there being one reinforcing ring for each convolution and each reinforcing ring having an inward radial portion engaging the trough of its corresponding convolution, a plurality of tie bars extending longitudinally of the tubing and interconnecting said end members, and opposed extension arms on an intermediate reinforcing ring, said extension arms having apertures with internal conical sections through which the tie bars extend for permitting limited relative movement between the reinforcing ring and the tie bars.

3. An expansion joint for interconnecting relatively shiftable conduits comprising a shifting unit having a pair of relatively shiftable end members, said members being arranged for connection respectively to said conduits, an annularly corrugated flexible metal tubing interconnecting said members, a plurality of reinforcing rings embracing the convolutions of the tubing, there being one reinforcing ring for each convolution and each reinforcing ring having an inward radial portion engaging the trough of its corresponding convolution, and a pair of tie bars interconnecting said members and pivotally connected at their ends thereto, at least one of said reinforcing rings being provided with a pair of diametrically extending projections each being apertured to form a pivotal connection with a corresponding tie bar.

References Cited in the file of this patent

UNITED STATES PATENTS

| 969,660 | Schmidt et al. | Sept. 6, 1910 |
| 1,797,151 | Lord | Mar. 17, 1931 |
| 2,196,676 | Johnson et al. | Apr. 9, 1940 |
| 2,314,776 | Dittus | Mar. 23, 1943 |
| 2,335,478 | Bergman | Nov. 30, 1943 |
| 2,404,447 | Mayancik | July 23, 1946 |
| 2,414,987 | Tobey | Jan. 28, 1947 |
| 2,420,053 | Muller | May 6, 1947 |

FOREIGN PATENTS

| 476,627 | Germany | May 2, 1929 |